United States Patent [19]
Bonenberger et al.

[11] Patent Number: 5,242,157
[45] Date of Patent: Sep. 7, 1993

[54] IMPACT DAMPER

[75] Inventors: Hartmut Bonenberger, Puchheim-Nord; Holger Kirchner, Ruppichteroth; Kurt Wagner, München, all of Fed. Rep. of Germany

[73] Assignee: Boge Aktiengesellschaft, Eitorf, Fed. Rep. of Germany

[21] Appl. No.: 763,937

[22] Filed: Sep. 23, 1991

[30] Foreign Application Priority Data

Sep. 22, 1990 [DE] Fed. Rep. of Germany ....... 4030035

[51] Int. Cl.$^5$ .......................... F16F 9/43; B61G 11/12
[52] U.S. Cl. .................................. 267/64.26; 188/316; 267/64.28; 267/116; 293/134
[58] Field of Search ............... 267/116, 119, 130, 126, 267/127, 64.26, 64.28; 188/269, 281, 314, 316, 317; 293/133, 134

[56] References Cited

U.S. PATENT DOCUMENTS

| | | | |
|---|---|---|---|
| 3,533,613 | 10/1970 | Bendicsen | 267/64.28 |
| 4,029,304 | 6/1977 | Sakaguchi et al. | 267/116 |
| 4,078,638 | 3/1978 | Koyama et al. | 267/116 |
| 4,641,872 | 2/1987 | Löhr et al. | 293/133 |
| 4,719,941 | 1/1988 | Moser | 137/599 |
| 4,854,554 | 8/1989 | Ludwig | 267/64.28 |
| 4,988,081 | 1/1991 | Dohrmann | 267/64.28 |

FOREIGN PATENT DOCUMENTS 3419165 11/1985 Fed. Rep. of Germany .

Primary Examiner—Robert J. Oberleitner
Assistant Examiner—Kevin D. Rutherford
Attorney, Agent, or Firm—Nils H. Ljungman & Associates

[57] ABSTRACT

Impact damper for motor vehicles, the impact damper having two tubes which can be pushed one inside the other, the inner tube having a first and second fluid chamber and a gas chamber separated from the fluid chamber by a separating piston. A third fluid chamber is located behind a work piston and the tubes can be retracted or extended by changing the pressure within the fluid chambers of the impact damper.

9 Claims, 1 Drawing Sheet

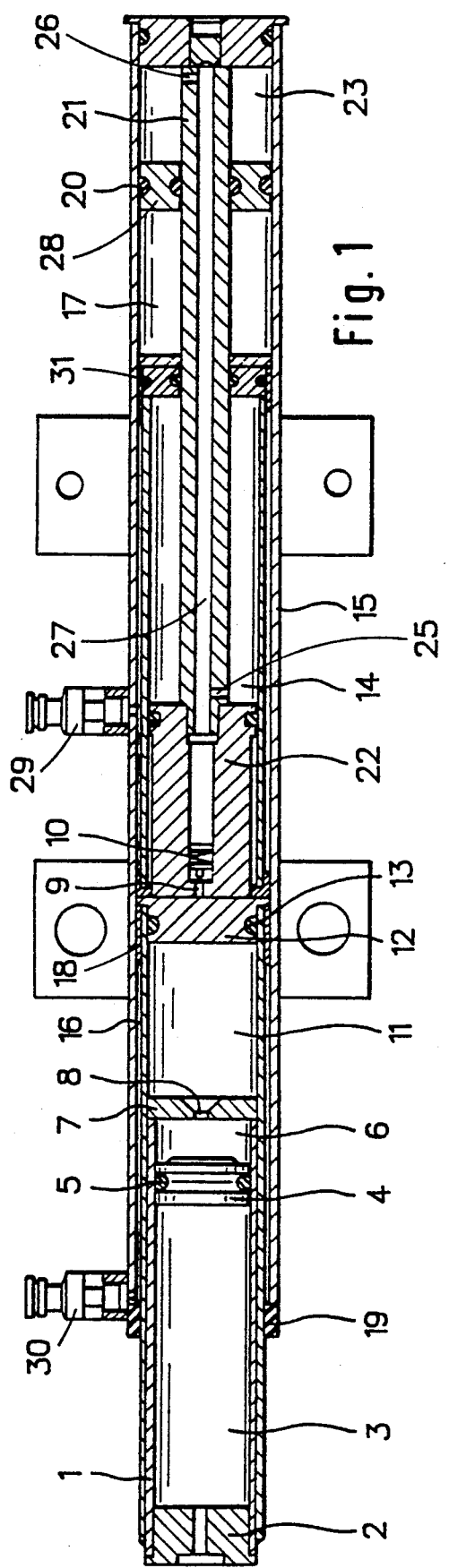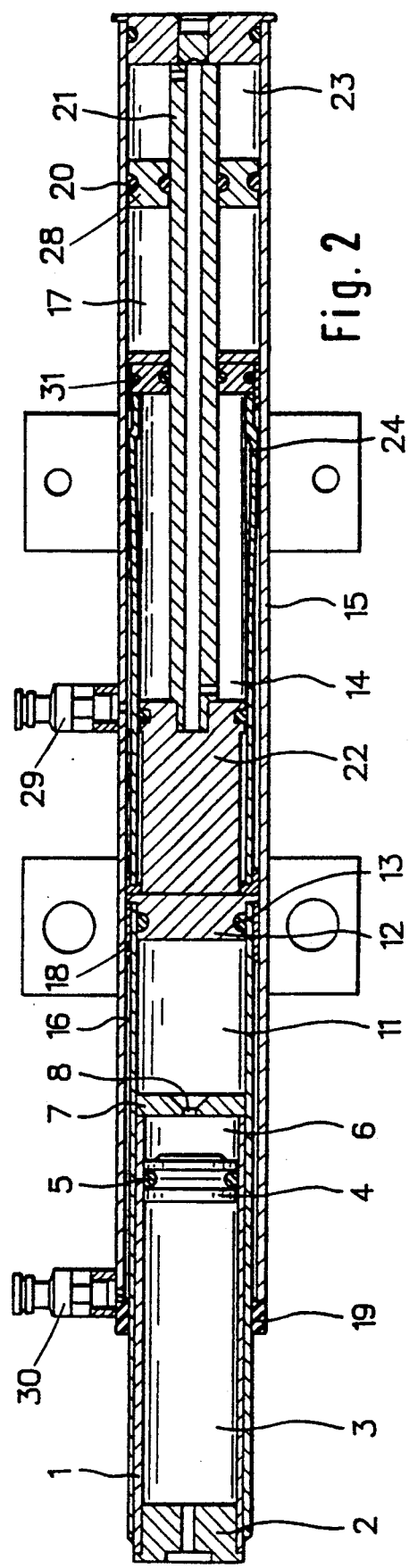

IMPACT DAMPER

BACKGROUND OF THE INVENTION

1. Field of the Invention

This invention relates to an impact damper having two tubes slidable one about the other, such that one of the tubes can be pushed into the other tube. In particular, such an impact damper is used in a motor vehicle to slow down the motor vehicle upon collision of the motor vehicle with an obstacle. Such an impact damper works by means of hydraulic damping forces and pneumatic spring forces. The inner tube of the impact damper is closed by a bottom, or base, and essentially comprises, in sequence starting from the base, a gas chamber holding a gas cushion at high pressure, a separating piston guided tightly and movably within the inner tube, a first fluid chamber, a partition defined within the inner tube and having a throttle opening, a second fluid chamber in communication with the first fluid chamber via the throttle opening, and a work piston.

2. Background Information

Known impact dampers, such as the impact damper as disclosed by DE-PS 34 19 165, which corresponds to U.S. Pat. No. 4,641,872, can generally have two tubes which are movable one inside of the other. Of the two tubes, the sealed inner tube of DE-PS 34 19 165 includes, in sequence starting from the bottom, a gas chamber containing a high pressure gas cushion, a separating piston guided so that it can move in a sealed manner within the inner tube, and a first fluid chamber connected via a throttle to a second fluid chamber, the first fluid chamber generating hydraulic damping forces. With such an impact damper, the maximum stroke of the impact damper is essentially large enough to absorb a collision impact at speeds of up to about 8 km/h. The expansion equalization and the return of the impact damper into the base configuration is accomplished by means of the gas cushion which is contained within the closed gas chamber.

OBJECT OF THE INVENTION

The object of the invention is to improve an impact damper so that, starting from a normal, or base configuration, the tubes can be axially extended under certain specified conditions to obtain an impact damper having an extended configuration which thereby has greater damping abilities, such that the desired damping and deformability of the impact damper can be achieved both in the base configuration and also in the extended configuration.

SUMMARY OF THE INVENTION

This object is achieved by the present invention in that, on the side of the work piston opposite the second fluid chamber, there is provided a second piston and a third fluid chamber, the third fluid chamber preferably being pressurizable by means of a control such as a valve. This third chamber, starting from an initial pressure and a base configuration, pushes the external tube axially along the internal tube a defined axial distance when the pressure increases within the third chamber, thereby forming an additional fluid chamber between the second piston and the work piston. The second piston is preferably connected to a piston rod which is axially movable within the inner tube, and which piston rod is preferably connected at its other end to the outer tube.

One advantage here is that by means of the control, the expansion equalization chamber of the impact damper, experiences a pressure increase, so that the impact damper can be extended from the normal configuration into an extended configuration, which extended configuration may have, for example, an axial extension of about 100 mm as compared to the base configuration. When the extension is no longer necessary, the tubes can be retracted to the base configuration by a pressure release in the form of a reversal into the second chamber. The damping is thereby approximately identical both in the base configuration and in the extended configuration, whereby the additional stroke length of the extended impact damper advantageously increases the effectiveness of the impact damper. The maximum impact damper stroke is increased in the extended configuration to such an extent that it makes it possible for the impact damper to absorb the energies which occur in the event of collisions at speeds of up to about 15 km/h.

In accordance with one essential feature of the invention, the third and the additional fluid chamber are connected to one another by means of a flow connection having a damping valve or a throttle opening.

In accordance with an additional feature, between the outer surface of the inner tube and the inner surface of the outer tube there are two ring-shaped, sealed chambers, which are pressurized with a control medium by means of the control. A liquid or gaseous medium can thereby be advantageously used as the control medium.

In one essential embodiment, the seal of the chambers is fixed on one of the tubes, and the other seals can be moved in relation to the inner and outer tubes. In this case, by means of an external control, one chamber or the other is always pressurized with control medium, so that the tubes are either extended or retracted, as a function of the position of the control.

In one configuration of the invention, the third and the additional fluid chamber are connected to one another in the area of movement of the second piston by grooves in the wall of the inner tube.

One feature of the invention resides broadly in an impact damper having two tubes slidable one about the other, the inner tube of the impact damper comprising, in sequence starting from the base, a gas chamber containing a gas cushion at high pressure, a separating piston guided tightly and movably within the inner tube, a first fluid chamber, a partition located within the inner tube and equipped with at least one throttle opening, a second fluid chamber in communication with the first fluid chamber via the throttle opening and a work piston. The impact damper is characterized by the fact that on the side of the work piston opposite the second fluid chamber, there is a third fluid chamber, which can be pressurized by means of a control, and which third chamber, starting from an initial pressure and a base configuration, pushes the outer tube a defined axial distance along the inner tube when the pressure is increased, thereby forming an additional fluid chamber between the work piston and the second piston, which second piston is connected to an axially movable piston rod.

BRIEF DESCRIPTION OF THE DRAWINGS

A preferred embodiment of the invention is schematically illustrated in the accompanying drawings, in which:

FIG. 1 shows one embodiment of an impact damper in cross section, on which an external control valve is used; and FIG. 2 shows one embodiment of an impact damper in which the inner tube has grooved walls for fluid passage between the third fluid chamber and the additional fluid chamber.

BRIEF DESCRIPTION OF THE PREFERRED EMBODIMENTS

The impact damper illustrated in FIG. 1 has an inner tube 1 closed by a bottom 2. In sequence, starting from the bottom 2, there is preferably a gas chamber 3 enclosing a gas cushion at high pressure, a separating piston 4 guided tightly and movably within the inner tube 1 by means of a gasket 5, a first fluid chamber 6, and a partition 7 within the inner tube 1, which partition preferably has a throttle opening 8 in the center. The second fluid chamber 11 can preferably be sealed from the inner jacket of the inner tube 1 by means of a work piston 12 within the inner tube 1 and the gasket 13.

On the side of the work piston 12 opposite the second fluid chamber 11, there is preferably a third fluid chamber 14.

This embodiment of an impact damper also shows that between the outer surface of the inner tube 1 and the inner surface of the outer tube 15, there are preferably chambers 16 and 17. The seal 18 is preferably stationary on the tube 1, while the seal 19 is preferably stationary on the inner surface of the outer tube such that the seal 19 is slidable on the inner tube 1.

By means of a control valve, 30 or 29 a control medium can respectively be introduced either into the chamber 16 or into the chamber 17, so that the outer tube 15 is essentially respectively moved into either the base configuration or the extended configuration, as a function of the pressurization. Element 31 disposed at the end of inner tube 1 allows fluid passage, via control valve 29, to and from chamber 17. When the pressure increases in the chamber 17, the medium in the third fluid chamber 14 is generally displaced through a throttle opening 10, via control valve 9, into a fourth fluid chamber which is formed between the work and a second piston 22. The deficient piston rod volume of the expansion equalization chamber 23 is replaced, and the outer tube 15 is pushed into the desired extended configuration with respect to the inner tube. The expansion equalization chamber 23 is essentially separated from the chamber 17 by the separating piston 28.

The orifices 25 and 26 in the piston rod 21 allow fluid flow between the third fluid chamber 14 and the expansion equalization chamber 23 via the interior passage 27 of the piston rod. Thus, since the third fluid chamber is also in fluid communication with the additional, or fourth fluid chamber that is formed, all three of the chambers, the expansion chamber 23, the third chamber 14 and the fourth chamber are essentially in fluid communication with each other to thereby allow displaced fluid to flow, as necessary, between the chambers as expansion and contraction of the tubes takes place.

As shown in FIG. 2, the third fluid chamber 14 and the additional, or fourth fluid chamber which forms between the work and second pistons, can be connected to one another in the area of movement of the second piston 22 by grooves 24 in the wall of the inner tube 1.

It can be possible for the control system to be automated by preferably providing the motor vehicle with a speed sensor for monitoring the vehicle speed, and/or possibly a distance sensor for monitoring the distance between the motor vehicle and an obstacle, i.e. another motor vehicle which is travelling in front of the vehicle. Such sensors could send signals to operate the control valves to thereby automatically adjust the relative extension of the tubes of the impact damper. Therefore, when the motor vehicle speeds up, or approaches another vehicle, the tubes of the impact damper can preferably be automatically extended to extend the bumper of the motor vehicle to prepare the motor vehicle for a collision. When the speed of the motor vehicle is reduced, or the obstacle is removed from in front of the vehicle, the tubes can preferably be automatically retracted back to the base configuration.

One aspect of the invention resides broadly in an impact damper having two tubes which can be pushed one into the other, in particular for motor vehicles, to slow down a vehicle colliding with an obstacle by means of hydraulic damping forces and pneumatic spring forces, in which an inner tube contains, in sequence starting from the bottom, a gas chamber containing a gas cushion at high pressure, a separating piston guided tightly and movably in the inner tube, a first fluid chamber, a partition located in the inner tube and equipped with throttle openings, a second fluid chamber and a work piston, characterized by the fact that on the side of the work piston 12 opposite the second fluid chamber 11, there is a third fluid chamber 14, which can be pressurized by means of a control, and which, starting from an initial pressure and a base configuration, pushes the outer tube 15 by a defined axial distance out of the inner tube 1 when the pressure is increased, so that an additional fluid chamber is formed between a second piston 22 connected to an axially movable piston rod 21 and the work piston 12.

Another aspect of the invention is the impact damper characterized by the fact that the third 14 and additional fluid chamber are connected to one another by means of a flow connection 10 having a damping valve 9 or a throttle opening.

Another aspect of the invention is the impact damper characterized by the fact that between the outer surface of the inner tube 1 and the inner surface of the outer tube 15, there are two ring-shaped, sealed chambers 16, 17, which can be pressurized with a control medium by means of the control.

Yet another aspect of the invention is the impact damper characterized by the fact that the control medium used is a liquid or gaseous medium.

A further aspect of the invention is the impact damper characterized by the fact that the seal 18 of the chambers 16, 17 is stationary on one of the tubes 1 or 15, and the other seals 19, 20 can be moved in relation to the inner tube 1 and the outer tube 15.

A yet further aspect of the invention is the impact damper characterized by the fact that the third 14 and additional fluid chamber are connected to one another in the area of movement of the piston 22 by grooves 24 in the wall of the inner tube 1.

All, or substantially all, of the components and methods of the various embodiments may be used with at least one embodiment or all of the embodiments, if any, described herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An impact damper for being connected between a frame and a bumper of a motor vehicle to dampen the impact of a collision of the motor vehicle with another object, said impact damper comprising:

an outer tubular member for being attached to one of:
the frame of the motor vehicle, and
the bumper of the motor vehicle;
said outer tubular member having a first end and a second end disposed a distance from the first end, said first end having an opening therein;
an inner tubular member having a portion disposed at least partially within said outer tubular member through said opening of said first end of said outer tubular member, said inner tubular member being axially movable within said outer tubular member;
said inner tubular member having a first end and a second end, said second end for being disposed within said outer tubular member;
said inner tubular member for being attached to the other of the frame of the motor vehicle and the bumper of the motor vehicle;
work piston means movably disposed within a portion of said inner tubular member, said work piston means comprising:
a first work piston disposed within said inner tubular member to divide said inner tubular member into a first and a said second portion;
said first portion of said inner tubular member comprising:
a gas chamber disposed adjacent said first end of said inner tubular member;
a first fluid chamber disposed adjacent said gas chamber;
a second fluid chamber disposed adjacent said first fluid chamber and between said first fluid chamber and said work piston means; and
said second portion of said inner tubular member comprising at least a third fluid chamber disposed between said first work piston means and said second end of said inner tubular member;
a second work piston, said second work piston being disposed within said third fluid chamber of said second portion of said inner tubular member;
said second work piston having an extremity for being connected to said outer tubular member to allow for axial movement of said second work piston within said inner tubular member upon said axial movement of said inner tubular member within said outer tubular member;
said second work piston defining, within said third fluid chamber, upon said axial movement of said second work piston within said inner tubular member, a first chamber portion and a second chamber portion;
said first chamber portion for being formed between said first and said second work pistons upon said axial movement of said second work piston within said third chamber; and
said first and said second chamber portions are separated by said second work piston.

2. The impact damper according to claim 1, wherein said second piston means comprises an opening therethrough for fluid communication between said first and said second chamber portions of said third fluid chamber;
said opening of said second work piston comprising at least one of:
a damping valve, and
a throttle opening to control flow of fluid between said first chamber portion and said second chamber portion.

3. The impact damper according to claim 2, further including:
means for axially moving said outer tubular member and said inner tubular member relative to one another to vary the damping capability of said adjustable impact damper.

4. The impact damper according to claim 3, wherein said means for axially moving said tubular members comprises:
at least a fourth and a fifth fluid chamber disposed between said outer and said inner tubular members;
one of said at least a fourth and a fifth fluid chamber being pressurizable to relatively move said inner tubular member out of said outer tubular member to thereby increase the length of said impact damper and increase the damping capability; and
the other of said at least a fourth and a fifth fluid chamber being pressurizable to relatively move said inner tubular member into said outer tubular member to thereby decrease the length of said impact damper and decrease the damping capability; and
means for introducing fluid into and allowing fluid out of said at least a fourth and a fifth fluid chamber to pressurize and depressurize said at least a first and a second fluid chamber to provide said relative movement between said inner and said outer tubular members.

5. The impact damper according to claim 4, wherein:
said first fluid chamber is separated from said gas chamber by a separating piston;
said first fluid chamber is separated from said second fluid chamber by a partition; and
said partition has a throttle opening therein for fluid communication between said first fluid chamber and said second fluid chamber via said throttle opening.

6. The impact damper according to claim 5, wherein:
said second work piston is connected to said outer tubular member by a rod-like member;
said rod-like member has an inner bore along a length of said rod-like member;
said rod-like member comprises a first opening for fluid communication between said second chamber portion of said third fluid chamber and said inner bore of said rod-like member;
said bore of said rod-like member comprises said fluid passage of said second work piston thereby allowing passage of fluid between said first and said second chamber portions of said third fluid chamber via said bore of said rod-like member;
said outer tubular member comprises an expansion equalization chamber adjacent said second end of said said outer tubular member, said expansion equalization chamber being separated from said fifth fluid chamber within said outer tubular member by a separating piston;

said bore of said rod-like member further comprises a second opening for fluid communication between said bore of said rod-like member and said expansion equalization chamber thereby allowing fluid communication between said expansion equalization chamber and said first and said second chamber portions of said third fluid chamber via said bore of said rod-like member.

7. The impact damper according to claim 6, wherein:

said impact damper comprises a base configuration wherein said first end of said second work piston is disposed substantially adjacent said second end of said first work piston to absorb a vehicle impact occurring at speeds of up to about 8 km/h;

said impact damper comprises an extended configuration wherein said first end of said second work piston is disposed spaced apart from said second end of said first work piston to absorb a vehicle impact occurring at speeds of up to about 15 km/h;

said fluid within said first and said second chambers comprises one of: gas and liquid; and said opening of said partition comprises a throttle opening.

8. The impact damper according to claim 4 wherein:

said fourth fluid chamber is disposed about said inner tubular member between said inner tubular member and said outer tubular member, said fourth fluid chamber being located substantially adjacent said first end of said outer tubular member, said fourth fluid chamber being for said movement of said inner tubular member into said outer tubular member upon pressurization of said fourth fluid chamber;

said fifth fluid chamber is disposed at least partially about said second end of said inner tubular member and between said second end of said outer tubular member and said second end of said inner tubular member, said fifth fluid chamber being for movement of said inner tubular member out of said outer tubular member upon pressurization of said fifth fluid chamber; and said fourth fluid chamber and said fifth fluid chamber are separated by seal means fixedly disposed on said inner tubular member between said inner tubular member and said outer tubular member.

9. The impact damper according to claim 1, wherein said inner tubular member, in an area about the second work piston, has grooves therein for allowing fluid communication between said first and said second chamber portions of said third fluid chamber.

* * * * *